United States Patent

Lehovec

[15] 3,649,836

[45] Mar. 14, 1972

[54] ELECTRO-OPTICAL MULTIPLE IMAGE ARRANGEMENTS

[72] Inventor: Kurt Lehovec, 11 Woodlawn Drive, Williamstown, Mass. 01267

[22] Filed: Apr. 14, 1970

[21] Appl. No.: 28,420

[52] U.S. Cl. ............................. 250/209, 250/217, 250/237, 350/162 ZP
[51] Int. Cl. ..................... G02b 5/18, H01j 3/14, H01j 39/12
[58] Field of Search ............. 350/162 ZP; 343/753; 250/199, 250/216, 217, 237, 209; 313/108 D

[56] References Cited

UNITED STATES PATENTS

| | | | |
|---|---|---|---|
| 2,043,347 | 6/1936 | Clavier et al. | 350/162 ZP |
| 2,929,922 | 3/1960 | Schawlow et al. | 250/199 |
| 2,530,826 | 11/1950 | Kock | 343/753 X |

*Primary Examiner*—James W. Lawrence
*Assistant Examiner*—T. N. Grigsby

[57] ABSTRACT

An image-forming diffraction optics having a multiplicity of focal points is used for directing a coherent light beam toward a plurality of photocells located at these multiple image points, or else, for combining into a single light beam a plurality of light beams emitted from a plurality of coherent light sources located at these multiple image points. In another embodiment, light source, illuminated object and photocell registering light from this object are placed on such image points of a diffraction optical image-forming means that at least two pairs of the three couples formed by light source, photocell and illuminated object are in optical communication by means of said image-forming means.

28 Claims, 8 Drawing Figures

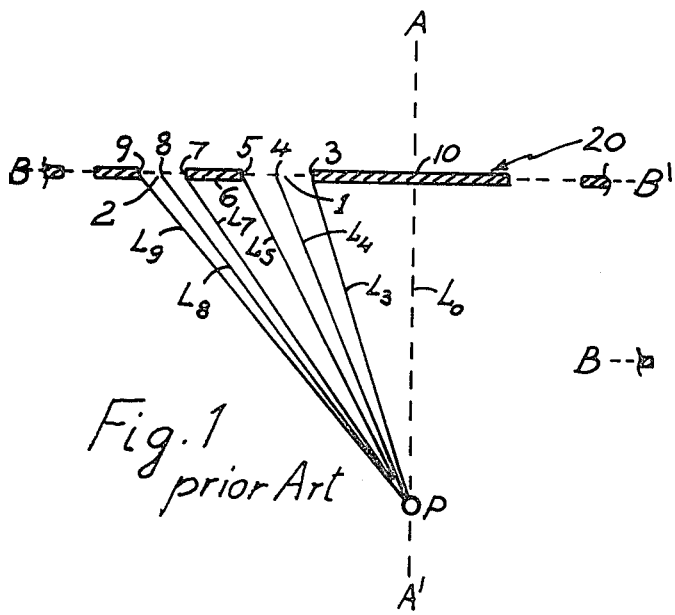
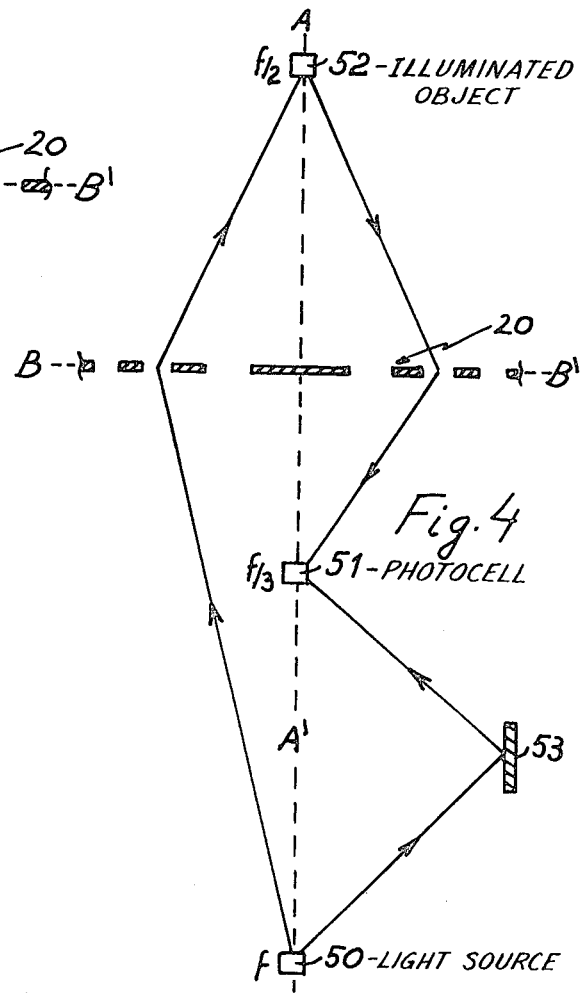
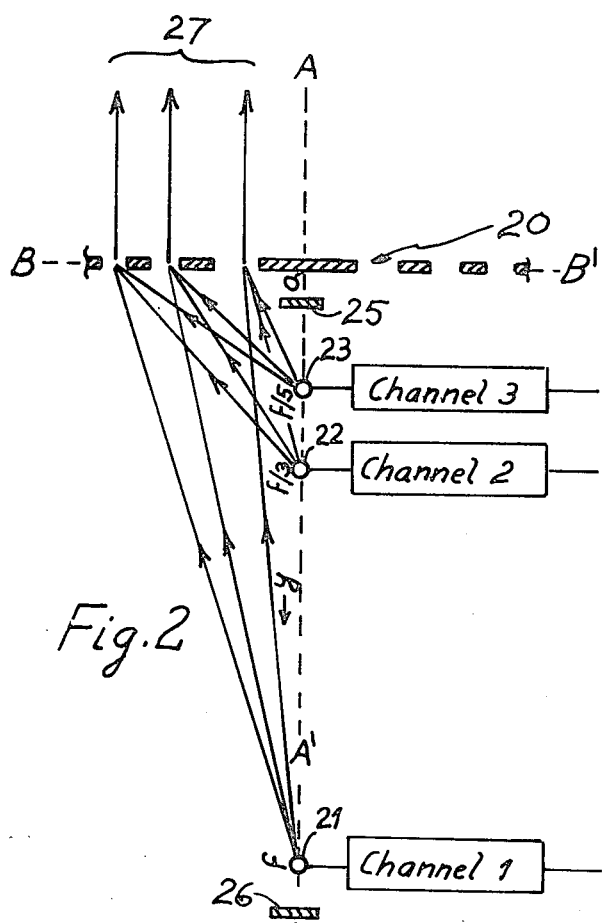
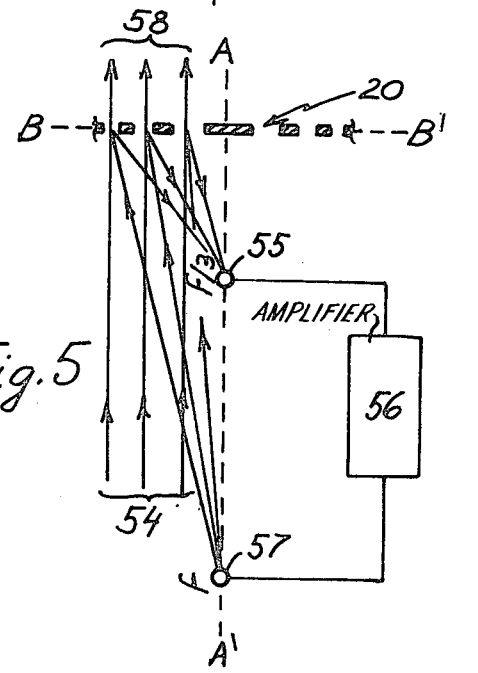

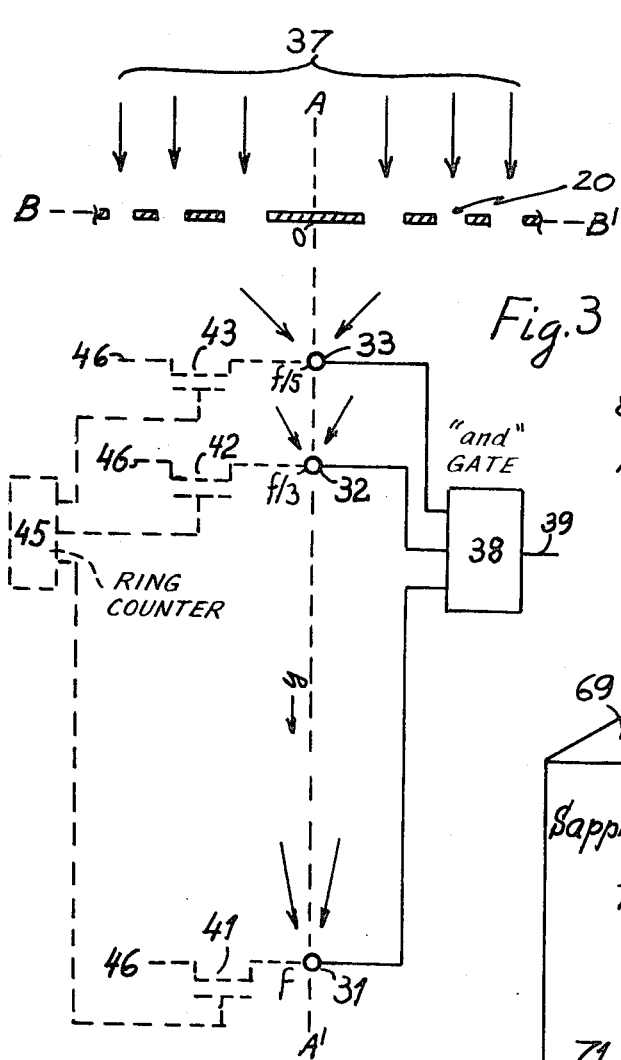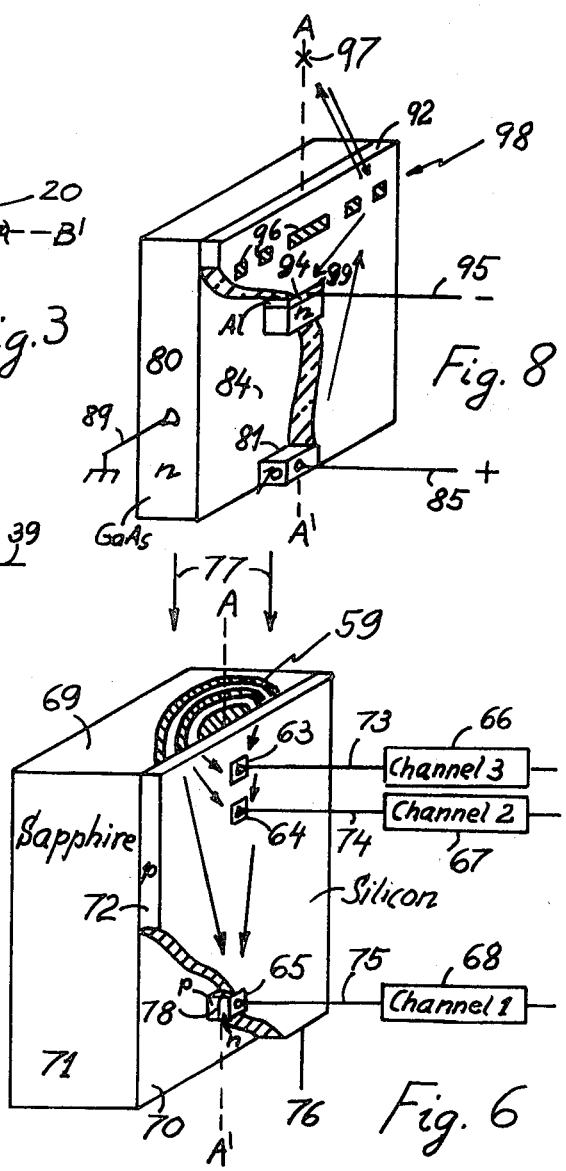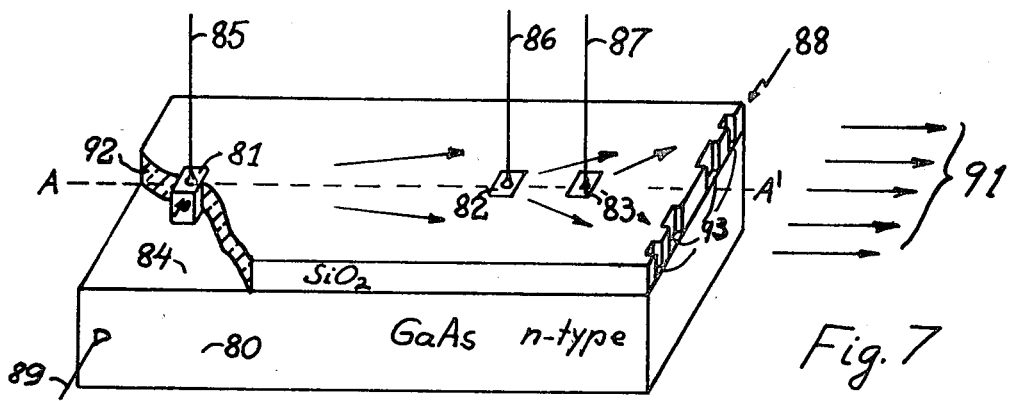
Fig. 3
Fig. 8
Fig. 6
Fig. 7

ELECTRO-OPTICAL MULTIPLE IMAGE ARRANGEMENTS

BACKGROUND OF THE INVENTION

This invention concerns the arrangement of two or more electrooptical elements relative to a diffraction optical image-forming means of coherent light. In particular, this invention concerns the placement of several electrooptical elements at the multiple image points of a light beam by a single zone plate thereby achieving optical fan-out or fan-in.

Cooke-Yarborough in U.S. Pat. No. 3,401,266 describes an electrooptical system, comprising light sources, photocells and diffraction optical means, hereafter referred to as zone plates. In this prior art patent, a set of zone plates has been used to focus light emitted from a single light emitter on a set of photocells to achieve fan-out of information encoded on said emitted light. Similarly, a set of zone plates has been used to combine light emitted from a set of light emitters onto a single photocell to achieve fan-in. Lehovec, in U.S. application Ser. No. 692,051, now U.S. Pat. No. 3,546,469 describes an electrooptical transducer involving a coherent light source, an object illuminated by a focused beam from said light source, and a photocell receiving focused light from said illuminated object. This structure requires two diffraction optical means if light source and light receiver are placed on the axis of the optical systems. Lehovec in U.S. application Ser. No. 653,245 now U.S. Pat. No. 3,569,997 teaches integration of zone plate optics and light source or photocell into a monolithic solid structure.

Major disadvantages of the set of zone plates used for fan-out or fan-in according to U.S. Pat. No. 3,401,266 are substantial space requirement, and the precise location of zone plates with respect to electrooptical elements which is easily disturbed when using a nonintegrated design.

It is an object of this invention to disclose a structure for optical fan-out or fan-in involving only a single diffraction optical means.

It is another object of this invention to disclose a structure for optical fan-out or fan-in involving a single diffraction optical means integrated with a set of electrooptical components into a monolithic solid structure.

It is still another object of this invention to describe a structure involving a single diffraction optical means, with a light source, a photocell and an illuminated object, arranged in such a manner that optical communications exist between at least two couples of them via light imaged by said diffraction optical means. These and other objects of this invention will be described in what follows.

BRIEF DESCRIPTION OF THE INVENTION

Briefly, this invention utilizes the property of a diffractive optical means, e.g., a zone plate, of having a multiplicity of image points. For instance, a coherent parallel light beam incident normally on a zone plate is not only focused onto the position of the primary focal length $f$, but also on the positions $f/3$, $f/5$, $f/7$, etc. By placing either photocells or else coherent light emitters at these positions optical fan-out or fan-in is achieved. By placing an emitter at distance $f$, a photo cell at $f/3$ and the object at distance infinity on the other side of zone plate, optical communication between object and the other two of these three elements is achieved.

Integration of fan-out or fan-in can be achieved by using a set of photoelectric elements on a planar surface of a semiconducting single crystal wafer located at the appropriate spacings in conjunction with diffractive optics on said wafer, in particular, comprising a transparent coating of portions of said wafer.

BRIEF DESCRIPTION OF FIGURES

FIG. 1 shows a prior art cross section through portions of a zone plate showing two adjacent transparent zones and light beams from these zones to an axial point.

FIG. 2 shows a zone plate and a set of coherent light sources located at distances $f$, $f/3$, and $f/5$ for fan-in.

FIG. 3 shows a zone plate and a set of photocells located at distance $f$, $f/3$ and $f/5$ to generate a set of electric signals, i.e., fan-out.

FIG. 4 shows a light source, a photocell and an object placed at positions of optical communication by means of a zone plate.

FIG. 5 shows a repeater station for emitting an incident modulated coherent light beam with amplified intensity.

FIG. 6 shows an integrated structure of a zone plate, and a set of photocells for optical fan-out according to this invention.

FIG. 7 shows an integrated structure of a diffractive image-forming means and a set of coherent light sources for optical fan-in according to this invention.

FIG. 8 shows an integrated structure of diffractive image-forming means, light source and photocell positioned according to this invention.

PREFERRED EMBODIMENTS

Prior art FIG. 1 serves to illustrate the faculty of a diffractive image-forming means to generate multiple images. FIG. 1 is a vertical cross section along the axis A—A' through portion of a circular zone plate 20 located in the plane B—B'. Two transparent zones 1 and 2 of 20 are separated by the opaque zone 6. Boundary points and centers of transparent zones 1 and 2 have been designated by $j=3, 4, 5, 7, 8$ and 9. Rays from point P located on axis A—A' to these points have been designated by $L_j$. The same symbol $L_j$ will be used also for length of these rays. Distance of point P to zone plate, i.e., distance P to 10 is $L_0$ and distances from 10 to point $j$ will be designated by $l_j$ so that $L_j{}^2 = l_j{}^2 + L_0{}^2$. If P were located at the primary focal point $L_0=f$ of the zone plate, then $L_3=L_4-\lambda/4$, $L_5 = L_4+\lambda/4$, $L_7=L_4+3\lambda/4$, $L_7=L_4+3\lambda/4$, $L_8=L_4+\lambda$ and $L_9=L_4+5\lambda/4$ where $\lambda$ is the wavelength of coherent light for which the zone plate is designed.

Parallel incident light from above and passing through zone 1 arrives then at P with phase differences of less than $\lambda/2$, thus providing constructive interference.

A secondary focal point is located at distance $L_0'$ so that $L_8' - L_4' = 3\lambda$, $L_4'-L_3'=L_5'-L_4'=3/4\lambda$, and $L_7'-L_4'=9/4\lambda$. In this case, the rays passing through zone 1 have phase difference of $3/2\lambda$. While some of these rays annihilate each other by destructive interference, a net intensity remains which would be equivalent to a smaller opening of zone 1.

This remaining light intensity interferes constructively with that of zone 2, the phase difference being an integer multiple of $\lambda$.

Simple expressions are obtained if $L_0' >> l_j$. Then $L_j \cong L_0'(1+l_j{}^2/2L_0'{}^2)$ and the condition $L_8'-L_4'=3\lambda$ becomes $l_8{}^2-l_4{}^2=6L_0'\lambda$. On the other hand, we derive from $L_8-L_4'=\lambda$ the relation $l_8{}^2-l_4{}^2=2L_0\lambda=2f\lambda$, so that $L_0'=f/3$. Similarly, it can be shown that other secondary focal point exist at $f/5$, $f/7$, etc.

Destructive interference of all normally incident rays passing through a single zone is obtained if the phase differences between these rays span a range of $2\pi$, i.e., if $L_5''-L_3''<=\lambda, 2\lambda, 3\lambda$, etc.

Since $L_8''-L_4''\cong 2(L_5''-L_3'')$, it follows that for destructive interference $L_5''-L_3''\cong\frac{1}{2}(L_8''-L_4'')\cong(1/4L_0'')(l_8{}^2-l_4{}^2)=f\lambda/2L_0''$. Now $L_5''-L_3''$ was assumed to be an integer multiple of $\lambda$, so that $L_0''=f/(\text{even integer})$; i.e., $L_0''=f/2, f/4$, etc., is the condition for destructive interference for vertically incident light.

So far, we have considered parallel vertically incident light.

Next, we consider two points P' and P'' located at the axis A—A' at arbitrary distance $L_0'$ and $L_0''$ from 10. The following considerations apply regardless of whether these points are located at same or else opposite sides from B—B'. We ask for conditions that coherent light emitted from P' interferes constructively at P'', i.e., that these points are in optical communication with each other by means of the zone plate. It can be shown that this will be the case if $L_8'+L_8''-(L_4'+L_4'')=\lambda, 3\lambda, 5\lambda$, etc. Using the previously given approximation, we obtain $l_8{}^2-l_4{}^2=2/(1/L_0'+1/L_0'')$ times $\lambda, 3\lambda, 5\lambda$, etc., and since $l_8{}^2-$ $l_4{}^2=2f\lambda$, $1/L_0'+ 1/L_0''=1/f$, $3/f$, $5/f$, etc. For instance, the points located at distances $2f$ on each side of B—B' communicate constructively.

By similar arguments, it can be shown that $1/L_0'+1/L_0''=2/f$, $4/f$, $6/f$, etc., are the conditions for destructive interference. For instance, points at distances $f$, $f/3$, $f/5$, etc., do not communicate with each other.

Next, we consider three points on the axis A—A' at distances $L_0'$, $L_0''$ and $L_0'''$. Let $L_0'$ and $L_0''$ satisfy the condition $1/L_0'+1/L_0''=n/f$ and $L_0'$ and $L_0'''$ satisfy the condition $1/L'_0+1/L_0'''=m/f$, then $1/L_0''+1/L_0'''=((n+m)/f)-2/L_0'=1/f(n+m-2f/L'_0)$.

The three couples of points communicate constructively or else destructively depending on the values of $n$, $m$ and $n+m-2f/L_0'$. For an odd integer value, constructive interference for the rays emitted from one point to the location of the other point results. For an even integer value, destructive interference results. Note that $2f/L_0'$ can be chosen to be an even integer, or else the odd integer 1 for $L_0'=2f$.

Thus, $n+m-2f/L_0'$ can be made an even or else an odd integer, regardless of the values of the integers m and n by suitable choice of $L_0'$. It follows that we can choose three points at the axis A—A' so that only one pair communicates constructively, that two pairs communicate constructively and the third one does not, or else that all three pairs communicate constructively.

Referring now to FIG. 2, there is shown in cross section a zone plate 20 and three coherent light sources 21, 22, 23 located at its axis A—A' at distances from the zone plate $f$, $f/3$, $f/5$ marked along the Y-scale indicated. These light sources may be solid state injection lasers of the GaAs or $Ga_xAl_{1-x}As$ type. 25 and 26 are mirrors arranged to reflect radiation of the lasers emitted along the axis A—A' and thereby stimulating in-phase emission of all lasers, if so desired. The outgoing plane parallel light beams 27 are in phase and contain radiation of all lasers 21 to 23; i.e., optical fan-in has been achieved from the channels 1–3 supplying electrical information to the lasers 21–23.

In a modification of the operation just described, the mirrors 25, 26 can be removed and the lasers 21 to 23 are stimulated electrically at different times, thereby keeping the messages transmitted by the individual lasers in the beam 27 separated in time.

Coherent emission from several individual small lasers as compared to the emission from one larger laser has several advantages, viz.:

i. Better optical focusing of a small area element located at the axis, as contrasted with a large element extending farther from the axis; and
ii. Improved power dissipation through the periphery of a small laser, thus enabling operation at higher current densities.

It should be noted that beams emitted through 20 by light sources placed at the positions $f/m$ and $f/n$, where $m$, $n$ are odd integers, interfere constructively only if $f/m-f/n=((n-m)/mn)/f$ is an integer multiple of $\lambda$. This will be the case if $f=\lambda.1.3.5$, etc., up to the largest odd integer in the series $f$, $f/3$, $f/5$, etc., of positions at which light sources are placed.

Referring to FIG. 3, there is shown an arrangement similar to FIG. 2, but replacing the coherent light sources 21 to 23 of FIG. 2 by photocells 31 to 33 exposed to the vertically incident coherent light 37. The photocells are located at the multiple image points $f$, $f/3$, $f/5$ of 37 by means of 20.

In one application of the arrangement of FIG. 3, the electrical outputs of the photocells 31–33 in response to 37 are fed in an AND-gate 38, which transmits the output 39, in response to a signal from all photocells. Therefore, 38 suppresses noise-signals generated in the individual photocells and increases, therefore, signal/noise ratio of the photoreceiver.

In another application of the multiple photocell arrangement of FIG. 3, shown on the left side of FIG. 3 by dotted lines, the photocell signals are passed through gates 41–43 opened in sequence by a ring counter circuit 45 so that each photocell output is achieved only during a particular time interval, whereby messages of 37 arising at different time intervals can be separated and channelled into the desired electrical channel of output 46.

Referring now to FIG. 4, there is shown the arrangement of a zone plate optics 20, a coherent light source 50, a photocell 51 responsive to light of said light source, and an object 52 on which light emitted from 50 is focused by 20. Light source 50, photocell 51 and object 52 are placed at distances $f$, $f/3$ and $f/2$ from the zone plate so that the couples 50, 52 and 51, 52 communicate constructively by diffraction on 20, but the couple 50, 51 does not communicate. The integers $n$, $n+m-2f/L_0'$, and $m$ in the previously given equations for these couples are 3, 5 and 4, respectively. The arrangement of FIG. 4 can be used for translation of small displacements of 52 along the axis A—A' into electrical signals in the photocell output.

A modified arrangement of FIG. 4 incorporates a mirror 53 to direct a fraction of the light emitted from 50 onto photocell 51. The same purpose could be achieved by placing 51 at a different position so that 50 and 51 communicate constructively via 20. This could be achieved, for instance, by placing 50 at distance $2f$, 52 at distance $2f$ on the other side of 20, and 51 at distance $2f/5$.

The purpose of this modified arrangement is to have a comparison in the output of photocell 51 of two signals, that of the original light source 50, and that from the illuminated object 52. In a special embodiment these two signals can be made to interfere destructively, so that the resulting signal depends sensitively on the difference in light intensities, similar to the zero-branch signal in a bridge circuit. For such destructive interference it is necessary that the optical path length from object to the center of a transparent zone is an odd multiple of $\lambda/4$. Double this path length is traversed by light from source 50 over object 52 to photocell 51, so that a phase difference of odd multiple of $\lambda/2$ results as compared to light travelling from source 50 directly to photocell 51 over same center of transparent zone.

In another modified embodiment of the invention shown in FIG. 4, the object 52 is located at a very large distance from zone plate 20, so that source is placed at a focal point of the zone plate to focus on the object. Light source 50 is a pulsed laser source. Photocell 51 receives signals from source 50 directly over zone plate 20 and indirectly over illuminated object 52. There is a time delay of these two signals substantially equal to twice the distance of object from zone plate divided by light velocity. It is well-known practice to use such a time delay to measure distance of object. While photocell 51 in principle can be placed at position in constructive communication with light source, in practice it is preferred to place photocell at position of constructive communication with object, but destructive communication with light source, and to depend on second order effects such as stray light, imperfection of zone plate, of photocell positioning, finite size effect of photocell and second order terms in mathematical approximation cited previously, etc., in order to achieve some signal from source 50. This procedure is preferred since it reduces signal intensity received from light source directly to more equal level of signal intensity received from illuminated object. For instance, light source might be placed at distance $f$, photocell at distance $f/3$ to obtain destructive interference of light received by photocell from source over zone plate, and object at infinity.

FIG. 5 shows a parallel vertical incident incoming beam 54 focused by the zone plate 20 on the photocell 55, located at secondary focal point $f/3$. The electric signal of the photocell is amplified in 56 and fed into a laser 57 located at primary focal point $f$ and generating the outgoing beam 58, which also contains portions of incoming beam transmitted through 20. Phase shift networks can be included in 56 to obtain desired phase relations between portion of incoming beam transmitted through 20 and beam generated by 58.

The preceding discussion has demonstrated the need for placing photoelectric elements at carefully chosen positions within a precision of a fraction of the primary focal length $f$ of the diffraction optical means. While $f$ can, in principle, be chosen from a very wide range of values in the preferred embodiments of my invention, $f$-values from the range of 10 microns to 10,000 microns are typical. The precision of locating the electro-optical elements in case of $f$-values at the lower end of the cited range and the maintenance of that precision is made possible by integration of diffraction optics and electrooptical elements into a monolithic solid structure. The principle of this integration described by my application Ser. No. 653,245 now U.S. Pat. No. 3,569,997 is now applied to the present invention in the illustrations FIGS. 6, 7 and FIG. 8.

Referring to FIG. 6, there is shown a transparent block 71, e.g., sapphire, of the shape of an orthogonal parallelepipedon having one-half of a zone plate optics 59 on its face 69. The axis A—A' of this zone plate optics lies in the face 70 of the block 71. The face 70 is overlaid by an epitaxial film of silicon 72, generally $p$-type, but containing $n$-type islands 63, 64, 65 facing positions along the axis A—A' at distances f, f/3 and $f/5$ from the zone plate. Portion of 72 is cut back in drawing to show PN junction 78 between 65 and 72. The PN junctions between the $n$-islands 63, 64, 65 and the $p$-substrate 72 represent photocells, if biased in the blocking direction by leads 73, 74, 75 and substrate contact 76. A parallel vertically incident beam 77 of monochromatic coherent radiation to which silicon is photoelectrically responsive, is focused by 59 on these photocells, and their responses are fed into channels 1–3, thus providing electrical fan-out of a signal transmitted by the optical beam 77.

FIG. 7 shows an integrated fan-in structure comprising an $n$-type semiconducting wafer 80 of GaAs, a set of spaced $p$-type GaAs epitaxial islands 81, 82 and 83 on a surface 84 of this wafer. Each island in conjunction with its substrate 80 represents a PN junction light source. Connections 85, 86 and 87 to $n$-islands and 89 to $p$-substrate are provided to electrically activate and/or modulate said light sources. The light sources are provided with reflecting boundaries for laser operation (not shown). A one-dimensional zone "plate" 88 is placed on the surface 84, consisting of a diffraction grating dimensioned to combine the light emitted from the previously mentioned light sources into the plane parallel beam 91. Since most of the radiation of a PN-junction light source, particularly in the laser mode, is emitted in the junction plane, i.e., parallel to surface 84, the linear grating 88 combines most of the emitted radiation into the beam 91.

The concentration of the radiation onto the linear grating can be assisted by an insulating transparent coating 92 overlying the surface 84 such as silicon oxide or ZnS. The diffraction grating 88 may consist of cutouts 93 in said layer 92, of appropriate extension and dimensioned to produce phase shifts of $\pi$ compared to absence of openings; or else of openings or surfaces coated with opaque material to block radiation.

FIGS. 6 and 7 illustrate integrated structures for the electrooptical arrangements of FIGS. 3 and 2. Similarly, the electrooptical arrangements of FIGS. 4 and 5 can be integrated.

FIG. 8 shows an integrated structure of light source 81, photocell 94 and diffractive image-forming means 98 positioned with respect to illuminated object 97 as discussed in FIG. 4. In many respects, the structure of FIG. 8 is identical to that of FIG. 7, e.g., $n$-type GaAs substrate 80 contains a raised PN-junction GaAs light emitting diode 81, preferably operating in the laser mode, and emitting a sheet of light along transparent coating 92 of $SiO_2$, CdS or similar. This light is diffracted by 98 onto object 97. Portion of 92 is cut back for illustration purposes. Image-forming means 98 consists of linear set of slots 96 in 92 which can be either filled with opaque material or also left open and dimensioned to provide a phase shift of $\pi$, i.e., optical path difference $\lambda/2$ in comparison with equally dimensioned segments of material 92. FIG. 8 differs from FIG. 7 by having $n$-GaAs mesa on surface 84. It surface facing toward 98 is coated with a thin transparent Al film 99 to which contact 95 is connected. The Schottky barrier between 99 and adjacent GaAs is the photocell 94 which operates by photoelectric electron emission from Al to GaAs when reverse biased. Contacts to this photocell are 95 and substrate contact 89. Light emitted for 81 is focused by 98 on object 97, and light reflected from illuminated object 97 is focused by 98 on photocell 95 for registration. Displacements of 97 along axis A–A' can thus be registered electrically by 95 as taught in my application Ser. No. 692,051 now U.S. Pat. No. 3,546,469.

While the preferred embodiments have utilized light source or else photocells, my inventive concept also includes other electrooptical elements, e.g., electrically light modulating elements.

Since there are many different embodiments of my present invention, it should be understood that this invention is not limited by the preferred embodiments described, but encompasses all structures characterized by the following claims, wherein "optical communication between two points by a diffractive image-forming means" signified the property that coherent light emitted from one of these points forms an image by constructive interference at the position of said other point when travelling from said one to said other point via said diffractive image-forming means; "electrooptical element" signifies a structure for conversion of electric energy into coherent radiation or vice versa; and "primary focal length" of a diffractive image-forming means is the distance of that image point of coherent parallel axially incident light, for which optical path length for rays passing through two adjacent transparent zones of the zone plate differs by one wavelength.

I claim:

1. A structure comprising a diffractive image-forming means placed in the path of a coherent beam of radiation and having a plurality of spaced image points with respect to said beam, in combination with at least two electrooptical elements for radiation each placed at a different said image point of said beam said spaced image points arising from constructively interfering rays whereby the path lengths of said constructively interfering rays passing through neighboring zones of said diffractive image-forming means to one of said image points differ by an integral multiple of a wavelength, said integral multiple differing for any two of said plurality of spaced image points.

2. The structure of claim 1 whereby said at least two electrooptical elements are photocells.

3. The structure of claim 2 including connection of each said photocell to a different electrical channel, thus providing electrical fan-out of optical information transmitted by said beam.

4. The structure of claim 3 including means to activate each said channel at a different time.

5. The structure of claim 1 whereby said at least two electrooptical elements are light emitters.

6. The structure of claim 5 including means for activating said at least two light emitters at different times.

7. The structure of claim 5 whereby said at least two light emitters are lasers which are triggered in synchronization.

8. The structure of claim 5 whereby said at least two light emitters are activated from different electrical channels thereby providing fan-in of electrical information into a single beam of radiation.

9. The structure of claim 1 whereby one of said at least two electrooptical elements is a light emitter and another one of said at least two electrooptical elements is a photocell.

10. The structure of claim 9 including a circuit connection between said photocell and said light emitter whereby the photocell current regulates the light output of said emitter.

11. A structure for intensifying an incident coherent monochromatic light beam, said structure including a diffractive image-forming means designed for the wavelength of said monochromatic light beam and placed that said light beam travels substantially along the axis of said image-forming means; a photocell responsive to said light beam placed at an image point of said light beam by said image-forming means; a coherent monchromatic light source of same wavelength as said light beam placed at another image point of said light beam by said image-forming means; a circuit connecting said photocell with said light source which regulates the emission of said light source in response to the output of said photocell; said emission thereby proving an outgoing beam which is responsive to the incident beam.

12. A structure for illumination of an object by focused monochromatic coherent radiation and for electrical registration of said radiation reflected by said object, said structure including
   i. A diffractive image-forming means whose optical axis is substantially directed toward said object;
   ii. A light source emitting coherent monochromatic radiation of wavelength for which said image-forming means is designed, said light source placed at a position of said axis in optical communication with said object;
   iii. A photocell responsive to said radiation placed at another position of said axis, said other position also in optical communication with said object.

13. The structure of claim 12 whereby said positions of light source and of photocell are chosen in such a manner that radiation emitted by said light source travelling to said image-forming means and from there directly to said photocell interferes destructively at said position of said photocell.

14. The structure of claim 12 including means to direct radiation from said light source onto said photocell without first reaching said object.

15. The structure of claim 1 whereby the primary focal length f of said image-forming means is large compared to lateral dimension of said image-forming means, said light beam has a plane wave front and travels along the axis of said image-forming means; and said spaced image points are chosen from the set $f/n$ where $n$ is an odd integer number.

16. The structure of claim 1 whereby the primary focal length $f$ of said image-forming means is large compared to its lateral extension and the distances $L$, $L'$ from said image-forming means of the at least two electrooptical elements and the distance $L''$ of the origin or termination point of said beam satisfy the relations $1/L+L'=m/f$ $1/L+L''=n/f$ $1/L'+1/L''=p/f$ whereby $m$, $n$ and $p$ are integers.

17. An integrated electrooptical structure according to claim 1 including a block of solid material having a substantially flat surface; said diffractive image-forming means on said block with the optical axis of said image-forming means substantially along said flat surface; said at least two electrooptical elements being solid stage electrooptical elements and located on or at said surface at positions substantially along said axis; said positions at image points by said image-forming means of said beam.

18. The structure of claim 17 whereby said electrooptical elements include PN-junctions substantially parallel to said flat surface.

19. The structure of claim 18 whereby said electrooptical elements are PN-junction lasers, oriented to radiate substantially toward said image-forming means.

20. The structure of claim 17 whereby said image-forming means is a one-dimensional diffraction grating on said flat surface.

21. The structure of claim 20 whereby said electrooptical elements are elevated portions of said substantially flat surface, surrounded by a transparent insulating film overlying said flat surface, said image-forming means being a diffraction grating in said transparent film.

22. The structure of claim 17 whereby one of said at least two image-forming means is a PN-junction light source, and the other of said at least two image-forming means is a photocell responsive to radiation of said light source.

23. The structure of claim 22 whereby said photocell is a Schottky barrier diode to same substrate material as PN-junction light source.

24. An integrated structure for electrically activated emission of radiation and electric registration of said radiation, said structure comprising a semiconducting body having a substantially flat surface, a first elevated portion of said body extending above said surface containing a radiation emitting electrical component, a second elevated portion of said body extending above said surface, and containing a photocell exposed to said radiation and means to connect said photocell into a circuit for electric registration of said radiation.

25. The structure of claim 24 including an optical element located on said flat surface to focus said radiation on said photocell.

26. The structure of claim 24 whereby said radiation emitting electrical component comprises a PN-junction substantially parallel to said flat surface.

27. The structure of claim 24 whereby said photocell comprises a Schottky barrier contact to said second elevated portion.

28. A structure comprising a diffractive image-forming means placed in the path of a coherent beam of radiation and having a plurality of spaced image points with respect to said beam, in combination with at least two electric sensors of said radiation, each of said at least two sensors placed at a different said image point of said beam and electrically connected to a different channel, said at least two channels connected to an AND-gate for discrimination of a weak incident optical signal transmitted in said beam against random electrical circuit noise of said channels thereby leading to an improved signal to noise ratio.

* * * * *